United States Patent
Zhang et al.

(10) Patent No.: US 12,115,877 B2
(45) Date of Patent: Oct. 15, 2024

(54) BATTERY-SWAPPING AND ENCRYPTION SYSTEM AND METHOD FOR ELECTRIC VEHICLE

(71) Applicant: AULTON NEW ENERGY AUTOMOTIVE TECHNOLOGY GROUP, Shanghai (CN)

(72) Inventors: Jianping Zhang, Shanghai (CN); Wencheng Lu, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 936 days.

(21) Appl. No.: 17/262,191

(22) PCT Filed: Jul. 23, 2019

(86) PCT No.: PCT/CN2019/097281
§ 371 (c)(1),
(2) Date: Aug. 20, 2021

(87) PCT Pub. No.: WO2020/020150
PCT Pub. Date: Jan. 30, 2020

(65) Prior Publication Data
US 2021/0380017 A1    Dec. 9, 2021

(30) Foreign Application Priority Data

Jul. 23, 2018 (CN) .......................... 201810813412.5
Jul. 23, 2018 (CN) .......................... 201810814088.9
Jul. 23, 2018 (CN) .......................... 201810814093.X

(51) Int. Cl.
*H04L 9/32* (2006.01)
*B60L 53/65* (2019.01)
*B60L 53/80* (2019.01)

(52) U.S. Cl.
CPC ............... *B60L 53/80* (2019.02); *B60L 53/65* (2019.02); *H04L 9/3226* (2013.01); *H04L 2209/84* (2013.01)

(58) Field of Classification Search
CPC ... H04L 9/3226; H04L 2209/84; G06F 21/31; B06L 53/65; B06L 53/66; B06L 53/80; B06S 5/06
See application file for complete search history.

(56) References Cited

U.S. PATENT DOCUMENTS

| | | | |
|---|---|---|---|
| 2011/0084664 A1 | 4/2011 | White et al. | |
| 2013/0197734 A1* | 8/2013 | Okura | B60L 50/66 701/22 |
| 2017/0008402 A1 | 1/2017 | Thomas et al. | |

FOREIGN PATENT DOCUMENTS

| | | |
|---|---|---|
| CN | 101887985 A | 11/2010 |
| CN | 104816644 A | 8/2015 |

(Continued)

OTHER PUBLICATIONS

Aug. 1, 2023 first Notice of Reasons for Refusal issued in Japanese Patent Application No. 2021-504175.

(Continued)

*Primary Examiner* — Minh Dinh

(57) ABSTRACT

A battery-swapping and encryption system and method. The battery-swapping and encryption system comprises an encryption device (12). The encryption device (12) is used to receive a swapping-complete signal, and to set a swapping-authorized signal after receiving the swapping-complete signal. The swapping-complete signal is used to indicate that an electric vehicle has completed battery swapping in an authorized battery-swapping facility. The encryption device (12) is further used to store the swapping-authorized signal. The battery-swapping and encryption system and method can be used to detect whether battery swapping (Continued)

performed by a user conforms to operation regulations, thereby ensuring that batteries of a battery-swapping station circulate within the station itself without being lost.

19 Claims, 6 Drawing Sheets

(56) References Cited

FOREIGN PATENT DOCUMENTS

| CN | 105235542 A | 1/2016 |
|---|---|---|
| CN | 105471583 A | 4/2016 |
| CN | 105960347 A | 9/2016 |
| CN | 206012567 U | 3/2017 |
| CN | 107657290 A | 2/2018 |
| CN | 207207775 U | 4/2018 |
| CN | 110745028 A | 2/2020 |
| CN | 110751786 A | 2/2020 |
| CN | 110816361 A | 2/2020 |
| EP | 2623359 A1 | 8/2013 |
| JP | 2012075212 A | 4/2012 |
| JP | 5742587 B2 | 7/2015 |

OTHER PUBLICATIONS

Oct. 22, 2019 International Search Report issued in International Patent Application No. PCT/CN2019/097281.

Oct. 22, 2019 Written Opinion of the International Searching Authority issued in International Patent Application No. PCT/CN2019/097281.

First Office Action dated Jan. 27, 2021 issued on corresponding CN Application No. 201810813412.5.

2nd Office Action dated Oct. 19, 2021 issued in Counterpart Chinese Patent Application No. 201810813412.5.

* cited by examiner

BATTERY-SWAPPING AND ENCRYPTION SYSTEM AND METHOD FOR ELECTRIC VEHICLE

This application is a National Stage of International Application No. PCT/CN2019/097281, filed on Jul. 23, 2019, which claims priority of the Chinese Patent Application No. 201810813412.5 filed on Jul. 23, 2018, Application No. 201810814088.9 filed on Jul. 23, 2018 and Application No. 201810814093.X filed on Jul. 23, 2018, the contents of which are incorporated herein by reference in their entireties.

TECHNICAL FIELD

The present disclosure relates to the technical field of battery replacement for electric vehicles, and especially relates to a battery replacement encryption system and method for electric vehicles.

BACKGROUND

At present, the battery replacement vehicle is operated in two ways, one is to replace a battery at a battery replacement station, and the other is to charge independently. With the increase of operating hours, battery performance is declining, and in order to maintain operating capacity, the replacement station will add new batteries at any time. That is to say, the quality of the battery replaced from the battery replacement station will be maintained at a high level.

Driven by profit, users of the part of the vehicles charged and operated by themselves will use inferior batteries in private to replace the higher-quality batteries installed in the replacement station. At present, due to the lack of detection and control of the user's battery replacement behavior, it is impossible to judge whether the user's battery replacement behavior meets the operating standards, and it is impossible to effectively avoid the situation that high-quality batteries are wrongly or unauthorizedly replaced, which often results in the loss of high-quality batteries in the battery replacement station.

CONTENT OF THE PRESENT INVENTION

The technical problem to be solved in the present invention is for overcoming the defect that the technical solutions of replacing batteries for electric vehicles in the prior art can easily cause the loss of high-quality batteries in the battery replacement station, and to provide a battery replacement encryption method and system that can prevent the loss of high-quality batteries in the battery replacement station.

The present disclosure solves the above-mentioned technical problems through the following technical solutions:

A battery replacement encryption system, wherein comprises a battery replacement monitoring device and an encryption device;

the battery replacement monitoring device is used to send a replacement completion signal to the encryption device after an electric vehicle has replaced a battery;

the encryption device is used to set a replacement legal signal after receiving the replacement completion signal.

Preferably, wherein the encryption device is further used to store the replacement legal signal.

Preferably, wherein, when the electric vehicle replaces a battery again, the battery replacement monitoring device is further used to detect whether the replacement legal signal is set.

Preferably, wherein the encryption device is further used to send the replacement legal signal to a VCU (Vehicle Control Unit);

if the replacement legal signal is set, the VCU allows the electric vehicle to run;

otherwise, the VCU prohibits the electric vehicle from running

Preferably, wherein the encryption device is further used to obtain a battery lock signal, and the battery lock signal is used to indicate that a battery pack is installed on the electric vehicle;

the encryption device is further used to set the replacement legal signal after receiving the battery lock signal and the replacement completion signal.

Preferably, wherein the encryption device is further used to obtain a battery unlock signal, and the battery unlock signal is used to indicate that a battery pack is removed from the electric vehicle;

the encryption device is further used to reset the replacement legal signal after receiving the battery unlock signal.

Preferably, wherein the encryption device is further used to obtain a battery lock signal, and the battery lock signal is used to indicate that a battery pack is installed on the electric vehicle;

if the encryption device does not receive the replacement completion signal within a preset time after receiving the battery lock signal, the encryption device resets the replacement legal signal.

Preferably, wherein the battery replacement encryption system further comprises a password request unit, a password verification unit, and a decryption unit; the password verification unit is in communication connection with the encryption device;

the password request unit is used to send a password request signal to the decryption unit when the replacement legal signal is reset;

the decryption unit is used to send a password;

the password verification unit is used to receive the password;

the password verification unit is further used to verify the password, and is used to send a verification success identifier to the encryption device if the password verification is successful;

the encryption device is further used to set the replacement legal signal after receiving the verification success identifier.

The present invention further provides a battery replacement encryption method, wherein comprises the following steps:

a battery replacement monitoring device sends a replacement completion signal after an electric vehicle has replaced a battery;

an encryption device sets a replacement legal signal after receiving the replacement completion signal.

Preferably, wherein the battery replacement encryption method further comprises the following step:

the encryption device stores the replacement legal signal.

Preferably, wherein the battery replacement encryption method further comprises the following step:

when the electric vehicle replaces a battery again, the battery replacement monitoring device detects whether the replacement legal signal is set.

Preferably, wherein the battery replacement encryption method further comprises the following steps:

the encryption device sends the replacement legal signal to a VCU;

if the replacement legal signal is set, the VCU allows the electric vehicle to run;

otherwise, the VCU prohibits the electric vehicle from running

Preferably, wherein the battery replacement encryption method further comprises the following step:

the encryption device sets the replacement legal signal after receiving a battery lock signal and the replacement completion signal, and the battery lock signal is used to indicate that a battery pack is installed on the electric vehicle.

Preferably, wherein the battery replacement encryption method further comprises the following step:

the encryption device resets the replacement legal signal after receiving a battery unlock signal, and the battery unlock signal is used to indicate that a battery pack is removed from the electric vehicle.

Preferably, wherein the battery replacement encryption method further comprises the following step:

if the encryption device does not receive the replacement completion signal within a preset time after receiving a battery lock signal, the encryption device resets the replacement legal signal, and the battery lock signal is used to indicate that a battery pack is installed on the electric vehicle.

Preferably, wherein the battery replacement encryption method further comprises the following steps:

when the replacement legal signal is reset, a password request unit sends a password request signal to a decryption unit;

the decryption unit sends a password;

a password verification unit receives the password;

the password verification unit verifies the password, and if the password verification is successful the passport verification unit sends a verification success identifier to the encryption device;

the encryption device sets the replacement legal signal after receiving the verification success identifier.

The present invention further provides the following solutions:

A battery replacement encryption system, wherein comprises an encryption device; the encryption device is used to receive a replacement completion signal, and is used to set a replacement legal signal after receiving the replacement completion signal;

the replacement completion signal is used to indicate that an electric vehicle has completed a battery replacement in a legal battery replacement mechanism;

and the encryption device is further used to store the replacement legal signal.

Preferably, wherein the battery replacement encryption system further comprises a battery replacement monitoring device, and the encryption device is in communication connection with the battery replacement monitoring device; when the electric vehicle replaces a battery again, the battery replacement monitoring device is used to detect whether the replacement legal signal is set.

Preferably, wherein the encryption device is further used to obtain a battery lock signal, and the battery lock signal is used to indicate that a battery pack is installed on the electric vehicle;

and the encryption device is further used to set the replacement legal signal after receiving the battery lock signal and the replacement completion signal.

Preferably, wherein the encryption device is further used to obtain a battery unlock signal, and the battery unlock signal is used to indicate that a battery pack is removed from the electric vehicle;

and the encryption device is further used to reset the replacement legal signal after receiving the battery unlock signal.

Preferably, wherein the encryption device is further used to obtain a battery lock signal, and the battery lock signal is used to indicate that a battery pack is installed on the electric vehicle;

if the encryption device does not receive the replacement completion signal within a preset time after receiving the battery lock signal, the encryption device resets the replacement legal signal.

Preferably, wherein the battery replacement encryption system further comprises a password request unit, a password verification unit, and a decryption unit; the password verification unit is in communication connection with the encryption device;

the password request unit is used to send a password request signal to the decryption unit when the replacement legal signal is reset;

the decryption unit is used to send a password;

the password verification unit is used to receive the password;

the password verification unit is further used to verify the password, and is used to send a verification success identifier to the encryption device if the password verification is successful;

the encryption device is further used to set the replacement legal signal after receiving the verification success identifier.

The present invention further provides a battery replacement encryption method, wherein comprises the following steps:

after receiving a replacement completion signal, a battery replacement encryption system set a replacement legal signal, and the replacement completion signal is used to indicate that an electric vehicle has completed the battery replacement in a legal replacement mechanism;

an encryption device stores the replacement legal signal.

Preferably, wherein the battery replacement encryption method further comprises the following step:

when the electric vehicle replaces a battery again, a battery replacement monitoring device detects whether the replacement legal signal is set.

Preferably, wherein the battery replacement encryption method further comprises the following step:

the encryption device sets the replacement legal signal after receiving a battery lock signal and the replacement completion signal, and the battery lock signal is used to indicate that a battery pack is installed on the electric vehicle.

Preferably, wherein the battery replacement encryption method further comprises the following step:

the encryption device resets the replacement legal signal after receiving an battery unlock signal, and the battery unlock signal is used to indicate that a battery pack is removed from the electric vehicle.

Preferably, wherein the battery replacement encryption method further comprises the following step:

if the encryption device does not receive the replacement completion signal within a preset time after receiving a battery lock signal, the encryption device resets the replacement legal signal, and the battery lock signal is used to indicate that a battery pack is installed on the electric vehicle.

Preferably, wherein the battery replacement encryption method further comprises the following steps:

when the replacement legal signal is reset, a password request unit sends a password request signal to a decryption unit;

the decryption unit sends a password;

a password verification unit receives the password;

the password verification unit verifies the password, and if the password verification is successful, the passport verification unit sends a verification success identifier to the encryption device;

the encryption device sets the replacement legal signal after receiving the verification success identifier.

The positive and progressive effect of the present invention is that the battery replacement encryption method and system of the present invention can detect whether the user's battery replacement behavior meets operating standards, so as to ensure that the batteries of the battery replacement station (the battery replacement operator) circulate in its own system, and avoid the loss of batteries.

The present invention further provides the following solutions:

A battery replacement encryption system for electric vehicles, wherein comprises an encryption device; the encryption device is used to receive a replacement completion signal, and is used to set a replacement legal signal after receiving the replacement completion signal;

the replacement completion signal is used to indicate that an electric vehicle has completed the battery replacement in a legal battery replacement mechanism;

the encryption device is further used to send the replacement legal signal to a VCU (Vehicle Control Unit);

when the replacement legal signal is set, the VCU is used to allow the electric vehicle to run.

Preferably, wherein the encryption device is further used to obtain a battery lock signal, and the battery lock signal is used to indicate that a battery pack is installed on the electric vehicle;

the encryption device is further used to set the replacement legal signal after receiving the battery lock signal and the replacement completion signal.

Preferably, wherein the encryption device is further used to obtain a battery unlock signal, and the battery unlock signal is used to indicate that a battery pack is removed from the electric vehicle;

the encryption device is further used to reset the replacement legal signal after receiving the battery unlock signal;

when the replacement legal signal is reset, the VCU is used to prohibit the electric vehicle from running.

Preferably, wherein the encryption device is further used to obtain a battery lock signal, and the battery lock signal is used to indicate that a battery pack is installed on the electric vehicle;

if the encryption device does not receive the replacement completion signal within a preset time after receiving the battery lock signal, the encryption device resets the replacement legal signal;

when the replacement legal signal is reset, the VCU is used to prohibit the electric vehicle from running.

Preferably, wherein the battery replacement encryption system further comprises a password request unit, a password verification unit, and a decryption unit; the password verification unit is in communication connection with the encryption device;

the password request unit is used to send a password request signal to the decryption unit when the replacement legal signal is reset;

the decryption unit is used to send a password;

the password verification unit is used to receive the password;

the password verification unit is further used to verify the password, and is used to send a verification success identifier to the encryption device if the password verification is successful;

the encryption device is further used to set the replacement legal signal after receiving the verification success identifier.

The present invention further provides a battery replacement encryption method for electric vehicles, wherein comprises the following steps:

an encryption device sets a replacement legal signal after receiving a replacement completion signal, and the replacement completion signal is used to indicate that an electric vehicle has completed the battery replacement in a legal battery replacement mechanism;

the encryption device sends the replacement legal signal to a VCU; and when the replacement legal signal is set, the VCU is used to allow the electric vehicle to run.

Preferably, wherein the battery replacement encryption method further comprises the following step:

the encryption device sets the replacement legal signal after receiving a battery lock signal and the replacement completion signal, and the battery lock signal is used to indicate that a battery pack is installed on the electric vehicle.

Preferably, wherein the battery replacement encryption method for electric vehicles further comprises the following steps:

the encryption device resets the replacement legal signal after receiving a battery unlock signal, the battery unlock signal is used to indicate that a battery pack is removed from the electric vehicle; and when the replacement legal signal is reset, the VCU prohibits the electric vehicle from running Preferably, wherein the battery replacement encryption method for electric vehicles further comprises the following steps:

if the encryption device does not receive the replacement completion signal within a preset time after receiving a battery lock signal, the encryption device resets the replacement legal signal; the battery lock signal is used to indicate that a battery pack is installed on the electric vehicle; and when the replacement legal signal is reset, the VCU prohibits the electric vehicle from running Preferably, wherein the battery replacement encryption method for electric vehicles further comprises the following steps:

when the replacement legal signal is reset, a password request unit sends a password request signal to a decryption unit;

the decryption unit sends a password;

a password verification unit receives the password;

the password verification unit verifies the password, and if the password verification is successful, the passport verification unit sends a verification success identifier to the encryption device;

the encryption device sets the replacement legal signal after receiving the verification success identifier.

The positive and progressive effect of the present invention is that the battery replacement encryption method and system of the present invention can detect whether the user's battery replacement behavior meets operating standards, so

DETAILED DESCRIPTION OF THE PREFERRED EMBODIMENT

The following examples further illustrate the present disclosure, but the present disclosure is not limited thereto.

Embodiment 1

Figure 1:
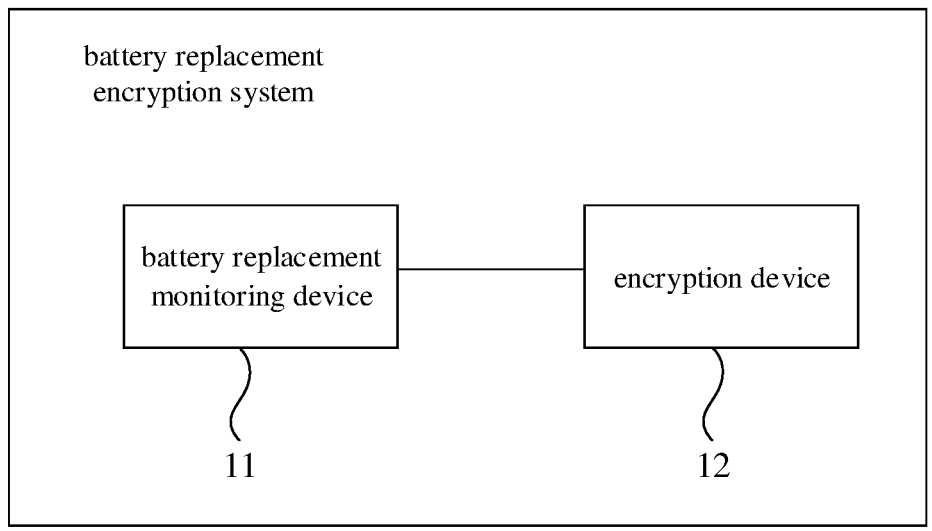
FIG. 1 is a schematic structural diagram of a battery replacement encryption system according to Embodiment 1 of the present invention.

This embodiment provides a battery replacement encryption system. As shown in FIG. 1, the battery replacement encryption system comprises a battery replacement monitoring device 11 and an encryption device 12. The battery replacement monitoring device is used to send a replacement completion signal to the encryption device 12 after an electric vehicle has completed a battery replacement. The encryption device 12 is used to set a replacement legal signal after receiving the replacement completion signal.

The battery replacement monitoring device 11 is installed in a battery replacement station and is used to authenticate a legal process of the battery replacement. When an user drives the electric vehicle to the battery replacement station (that is, a legal battery replacement operation organization) for battery replacement, after the battery replacement, the battery replacement monitoring device 11 sends the replacement completion signal, the replacement completion signal indicates that the battery replacement operation is a legal battery replacement operation performed at the battery replacement station, and the battery installed on the electric vehicle is a battery from a formal channel. After receiving the replacement completion signal, the encryption device sets the replacement legal signal (for example, the encryption device sets the replacement legal signal to "1"). If the user does not replace the battery at the battery replacement station, but replaces the battery in private, the encryption device cannot receive the replacement completion signal after the battery has been replaced and the replacement legal signal will be reset.

The state of the replacement legal signal can indicate whether the electric vehicle has performed a legal replacement operation (that is, conforms to the operation standards for battery replacement). If the replacement legal signal is set and the state is "1", it indicates that the electric vehicle has performed a legal replacement operation, and the battery installed on the electric vehicle is a battery from the formal channel; if the replacement legal signal is reset and the state is "0", it indicates that the electric vehicle has performed an illegal replacement operation, and the battery installed on the electric vehicle is very likely to be replaced with a low-quality battery. The state of the replacement legal signal can effectively identify whether the replacement operation of the electric vehicle is legal, so as to monitor the circulation of the battery. If it is found that the electric vehicle has replaced a battery in private that does not meet the operation standards for battery replacement, the battery replacement station can take corresponding measures, for example, claims for compensation.

Embodiment 2

On the basis of the battery replacement encryption system of Embodiment 1, the encryption device of the battery replacement encryption system provided in this embodiment is further used to store the replacement legal signal. That is, after each replacement, the encryption device stores the replacement legal signal. As mentioned above, the state of the replacement legal signal can indicate whether the electric vehicle has performed a legal replacement operation or an illegal replacement operation. When the electric vehicle arrives at the battery replacement station again for battery replacement, the battery replacement monitoring device detects whether the replacement legal signal is set. If the replacement legal signal is in the set state ("1"), it indicates that the previous replacement operation of the electric vehicle was legal, the battery installed on the electric vehicle is a battery from a formal channel, and the battery replacement station can replace the battery for the electric vehicle accordingly; if the replacement legal signal is in the reset state ("0"), it indicates that the previous replacement operation of the electric vehicle was illegal, the battery installed on the electric vehicle is very likely not a battery from a formal channel, and the battery replacement station can detect the battery accordingly, and if it is confirmed that the battery is a low-quality battery replaced in private, the battery replacement station can claim for compensation to the user.

Embodiment 3

Figure 2:
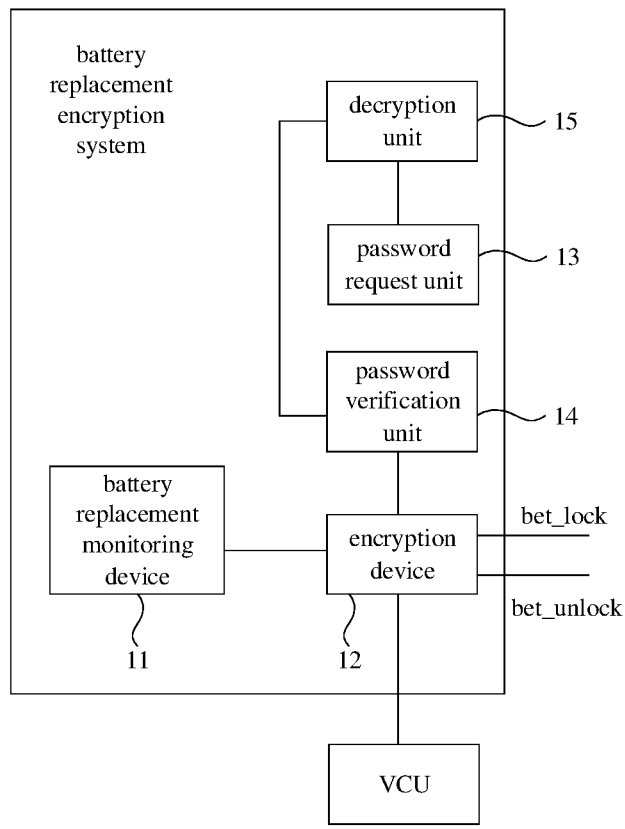
FIG. 2 is a schematic structural diagram of a battery replacement encryption system according to Embodiment 3 of the present invention.

On the basis of the battery replacement encryption system of Embodiment 1, as shown in FIG. 2, the encryption device 12 of the battery replacement encryption system provided in this embodiment is in communication connection with a VCU of the electric vehicle, and the encryption device 12 is further used to send a replacement legal signal to the VCU; if the replacement legal signal is set, the VCU allows the electric vehicle to run; otherwise, the VCU prohibits the electric vehicle from running That is, if the electric vehicle has replaced a battery at a legal battery replacement station, the VCU can receive a replacement legal signal with state "1" from the encryption device, and the VCU sends an instruction to allow the electric vehicle to run; if the user removes and replaces the battery in private, then the VCU receives a replacement legal signal with state "0" from the encryption device, and the VCU sends an instruction to prohibit the electric vehicle from running, so that the electric vehicle performing the illegal battery replacement cannot run.

In order to improve the security of the electric vehicle, as shown in FIG. 2, the encryption device 12 is further used to obtain a battery unlock signal bet_unlock, which is used to indicate that a battery pack is removed from the electric vehicle; the encryption device is further used to reset the replacement legal signal after receiving the battery unlock signal. The electric vehicle is set with a mechanism to detect the installation state of the battery. Once the battery is removed, the mechanism will send the battery unlock signal bet_unlock, the encryption device will reset the replacement legal signal after receiving the battery unlock signal, and the VCU will prohibit the electric vehicle from running to ensure security.

The encryption device is further used to obtain a battery lock signal bet_lock, and the battery lock signal bet_lock is used to indicate that a battery pack is installed on the electric vehicle; the encryption device is further used to set the replacement legal signal after receiving the battery lock signal and the replacement completion signal. When the battery is installed in place, the mechanism detecting the installation state of the battery sends the battery lock signal bet_lock. The encryption device receives the battery lock signal bet_lock.

If the battery replacement is completed in a legal and formal battery replacement station, the encryption device will further receive the replacement completion signal within a preset time (the preset time can be set as needed), the encryption device will set the replacement legal signal after receiving the battery lock signal and the replacement completion signal. VCU will allow the electric vehicle to run.

If the encryption device does not receive the replacement completion signal within the preset time after receiving the battery lock signal bet_lock, it indicates that the electric vehicle has performed a battery replacement operation, the battery has been removed, and another battery has been installed on the electric vehicle, However, this replacement operation was not performed at a formal battery replacement station, therefore, the encryption device does not receive the replacement completion signal, and the encryption device resets the replacement legal signal. The VCU will prohibit the electric vehicle from running In other optional embodiments of the present invention, because of an illegal private replacement operation, after the encryption device resets the replacement legal signal, the encryption device stores the replacement legal signal that has been reset. When the electric vehicle enters the battery replacement station again for battery replacement, the battery replacement monitoring device detects that the replacement legal signal is in the reset state ("0"), which indicates that the previous replacement operation of the electric vehicle was illegal, the battery installed on the electric vehicle is very likely not a battery from a formal channel, and the battery replacement station can detect the battery accordingly, and if it is confirmed that the battery is a low-quality battery replaced in private, the battery replacement station can claim for compensation to the user.

For electric vehicles that cannot run due to the battery replacement in private, this embodiment further provides humane remedial measures. As shown in FIG. 2, the battery replacement encryption system of this embodiment further comprises a password request unit 13, a password verification unit 14, and a decryption unit 15; the password verification unit 14 is in communication connection with the encryption device 12; the password request unit 13 is used to send a password request signal to the decryption unit 15 when the replacement legal signal is reset; the decryption unit is used to send a password; the password verification unit 14 is used to receive the password; the password verification unit 14 is further used to verify the password and is used to send a verification success identifier to the encryption device if the password verification is successful, the encryption device is further used to set the replacement legal signal after receiving the verification success identifier.

The decryption unit 15 is set in the customer service center of the battery replacement station (in other optional embodiments of the present invention, the decryption unit is set in the operation center of the operator of the electric vehicle). When the electric vehicle cannot run due to private battery replacement, the user can use the password request unit to send a password request signal to the decryption unit, for example, dial the customer service number of the battery replacement station, explain the private battery replacement situation to the customer service center, and request the customer service center for providing the unlock password. The customer service center records the information of the electric vehicle (license plate number, battery number, etc.), and records the behavior of private battery replacement (if necessary, the battery replacement station sends staff to the site to confirm). The customer service center is equipped with a decryption unit 15 capable of generating an unlock password, and the customer service center provides the user with the unlock password in the form of SMS, etc. After receiving the unlock password, the password verification unit performs verification according to a preset algorithm, and sends a verification success identifier to the encryption device if the password verification is successful; the encryption device sets the replacement legal signal after receiving the verification success identifier. After receiving the replacement legal signal which has been set, the VCU allows the electric vehicle to run.

Embodiment 4

Figure 3:
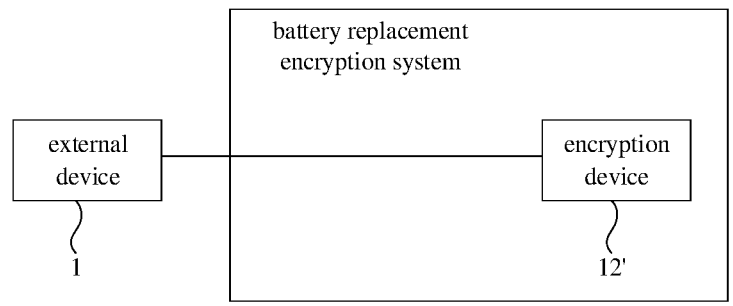
FIG. 3 is a schematic structural diagram of a battery replacement encryption system according to Embodiment 4 of the present invention.

This embodiment provides a battery replacement encryption system. As shown in FIG. 3, the battery replacement encryption system comprises an encryption device 12'; the encryption device 12' is used to receive a replacement completion signal, and is used to set a replacement legal signal after receiving the replacement completion signal; the replacement completion signal is used to indicate that an electric vehicle has completed a battery replacement in a legal battery replacement mechanism; and the encryption device 12' is further used to store the replacement legal signal.

When an user drives the electric vehicle to the battery replacement station (that is, a legal battery replacement operation organization) for battery replacement, after the battery replacement, an external device 1 set in the battery replacement station sends the replacement completion signal, the replacement completion signal indicates that the battery replacement operation is a legal replacement operation performed at the battery replacement station, and the battery installed on the electric vehicle is a battery from a formal channel. After receiving the replacement completion signal, the encryption device sets the replacement legal signal (for example, the encryption device sets the replacement legal signal to "1"). The encryption device stores the replacement legal signal, and the replacement legal signal which has been set indicates that the battery replacement is a legal operation.

If the user does not replace the battery at the battery replacement station, but removes and replaces the battery privately, the encryption device 12' cannot receive the replacement completion signal after the battery has been replaced, and the replacement legal signal will be reset by the encryption device 12' with state "0". The encryption device 12' stores the replacement legal signal, and the replacement legal signal which has been reset indicates that the battery replacement is an illegal operation.

The state of the replacement legal signal can indicate whether the electric vehicle has performed a legal replacement operation (that is, conforms to the operation standards for battery replacement). If the replacement legal signal is set and the state is "1", it indicates that the electric vehicle has performed a legal replacement operation, and the battery installed on the electric vehicle is a battery from a formal channel; if the replacement legal signal is reset and the state is "0", it indicates that the electric vehicle has performed an illegal replacement operation, and the battery installed on the electric vehicle is very likely to be replaced with a low-quality battery. The state of the replacement legal signal can be used to effectively identify whether the replacement operation of the electric vehicle is legal, so as to monitor the circulation of the battery. If it is found that the electric vehicle has replaced a battery in private that does not meet the operation standards for battery replacement, the battery replacement station can take corresponding measures, for example, claims for compensation.

Embodiment 5

Figure 4:
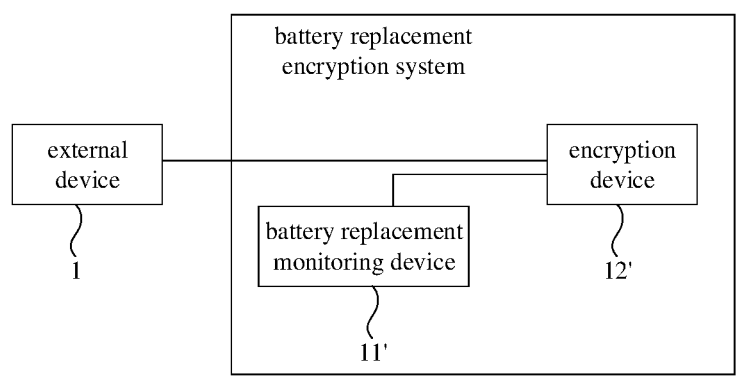
FIG. 4 is a schematic structural diagram of a battery replacement encryption system according to Embodiment 5 of the present invention.

On the basis of the battery replacement encryption system of Embodiment 4, as shown in FIG. 4, the battery replacement encryption system of this embodiment further comprises a battery replacement monitoring device 11', and the encryption device 12' is in communication connection with the battery replacement monitoring device 11'; When the electric vehicle replaces the battery again, the battery replacement monitoring device 11' is used to detect whether the replacement legal signal is set. In this embodiment, the encryption device 12' and the battery replacement monitoring device 11' are communicatively connected through 4G network (the fourth generation mobile communication technology).

After each replacement, the encryption device stores the replacement legal signal. As mentioned above, the state of the replacement legal signal can indicate whether the electric vehicle has performed a legal replacement operation or an illegal replacement operation. When the electric vehicle arrives at the battery replacement station again for battery replacement, the battery replacement monitoring device 11' reads the replacement legal signal stored in the encryption device 12', and detects whether the replacement legal signal is set. If the replacement legal signal is in the set state ("1"), it indicates that the previous replacement operation of the electric vehicle was legal, the battery installed on the electric vehicle is a battery from a formal channel, and the battery replacement station can replace the battery for the electric vehicle accordingly; if the replacement legal signal is in the reset state ("0"), it indicates that the previous replacement operation of the electric vehicle was illegal, the battery installed on the electric vehicle is very likely not a battery from a formal channel, and the battery replacement station can detect the battery accordingly, and if it is confirmed that the battery is a low-quality battery replaced in private, the battery replacement station can claim for compensation to the user.

Embodiment 6

Figure 5:
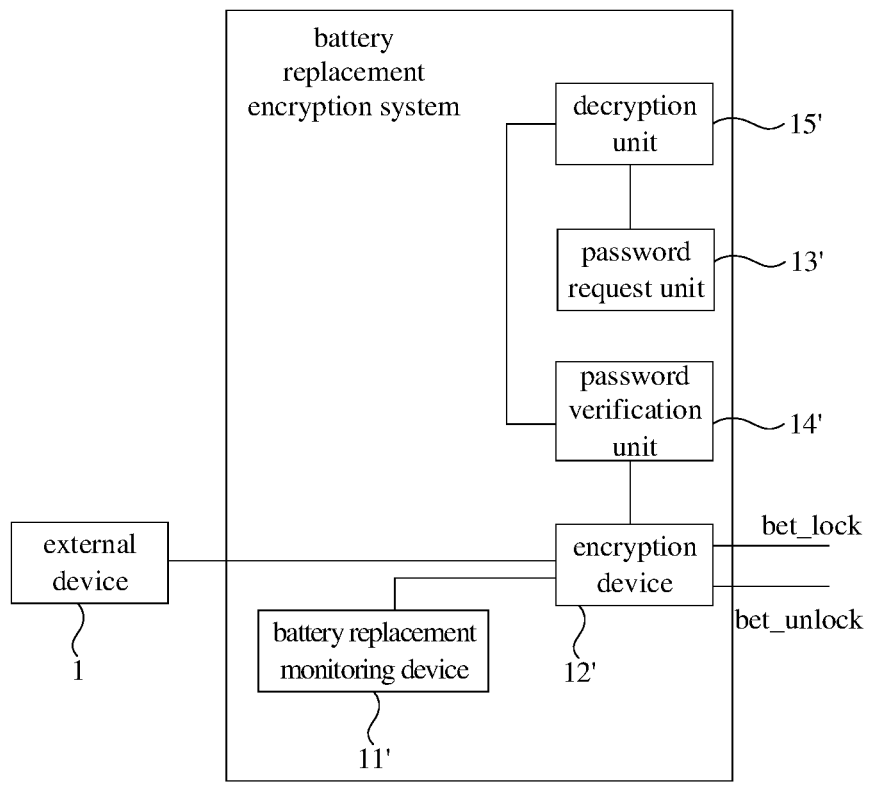
FIG. 5 is a schematic structural diagram of a battery replacement encryption system according to Embodiment 6 of the present invention.

On the basis of Embodiment 4, as shown in FIG. 5, the encryption device 12' of the battery replacement encryption system of this embodiment is further used to obtain a battery unlock signal bet_unlock, which is used to indicate that a battery pack is removed from the electric vehicle; the encryption device 12' is further used to reset the replacement legal signal after receiving the battery unlock signal. The electric vehicle is equipped with a mechanism for detecting the installation state of the battery. Once the battery is removed, the mechanism will send a battery unlock signal bet_unlock, and the encryption device will reset the replacement legal signal after receiving the battery unlock signal.

The encryption device is further used to obtain the battery lock signal bet_lock, and the battery lock signal bet_lock is used to indicate that a battery pack is installed on the electric vehicle; the encryption device is further used to set the replacement legal signal after receiving the battery lock signal and the replacement completion signal. When the battery is installed in place, the mechanism that detects the installation state of the battery sends the battery lock signal bet_lock. The encryption device receives the battery lock signal bet_lock.

If the battery replacement is completed in a legal and formal battery replacement station, the encryption device 12' will further receive the replacement completion signal within a preset time (the preset time can be set as needed), and the encryption device 12' will set the replacement legal signal after receiving the battery lock signal and the replacement completion signal.

If the encryption device does not receive the replacement completion signal within the preset time after receiving the battery lock signal bet_lock, it indicates that the electric vehicle has performed a battery replacement operation, the battery has been removed, and another battery has been installed on the electric vehicle, however, this replacement operation was not completed at a formal battery replacement station. Therefore, the encryption device does not receive the replacement completion signal, and the encryption device resets the replacement legal signal.

The battery replacement monitoring device 11' reads the replacement legal signal stored in the encryption device 12', and detects whether the replacement legal signal is set. If the replacement legal signal is in the set state ("1"), it indicates that the previous replacement operation of the electric vehicle was legal, and the battery installed on the electric vehicle is a battery from a formal channel; if the replacement legal signal is in the reset state ("0"), it indicates that the previous replacement operation of the electric vehicle was illegal.

For users who have performed an illegal battery replacement in private, the battery replacement encryption system of this embodiment provides remedial measures. As shown in FIG. 3, the battery replacement encryption system of this embodiment further comprises a password request unit 13', a password verification unit 14', and a decryption unit 15'; the password verification unit 14' is in communication connection with the encryption device 12'; and the password request unit 13' is used to send a password request signal to the decryption unit 15' when the replacement legal signal is reset; the decryption unit is used to send a password; the password verification unit 14' is used to receive the password; the password verification unit 14' is further used to verify the password, and is used to send a verification success identifier to the encryption device if the password verification is successful; the encryption device is further used to set the replacement legal signal after receiving the verification success identifier.

The decryption unit 15' is set in the customer service center of the battery replacement station (in other optional embodiments of the present invention, the decryption unit is set in the operation center of the operator of the electric vehicle). When the user realizes that the battery replacement in private does not meet the operation standards for battery replacement or is a breach of contract, and the user is willing to reinstall the battery from the formal channel on the electric vehicle, the user can use the password request unit to send a password request signal to the decryption unit. For example, dial the customer service number of the battery replacement station, explain to the customer service center the situation of the private battery replacement, and request the customer service center to provide the unlock password. The customer service center records the information of the electric vehicle (license plate number, battery number, etc.), and records the behavior of private battery replacement (if necessary, the battery replacement station sends staff to the site to confirm). The customer service center is equipped with a decryption unit 15', which can generate an unlock password, and the customer service center provides the user with the unlock password in the form of SMS, etc. After receiving the unlock password, the password verification unit performs verification according to the preset algorithm, and sends a verification success identifier to the encryption device if the password verification is successful; the encryption device sets the replacement legal signal after receiving the verification success identifier. If the password verification fails, the legal signal will remain the state of reset.

Embodiment 7

Figure 6:
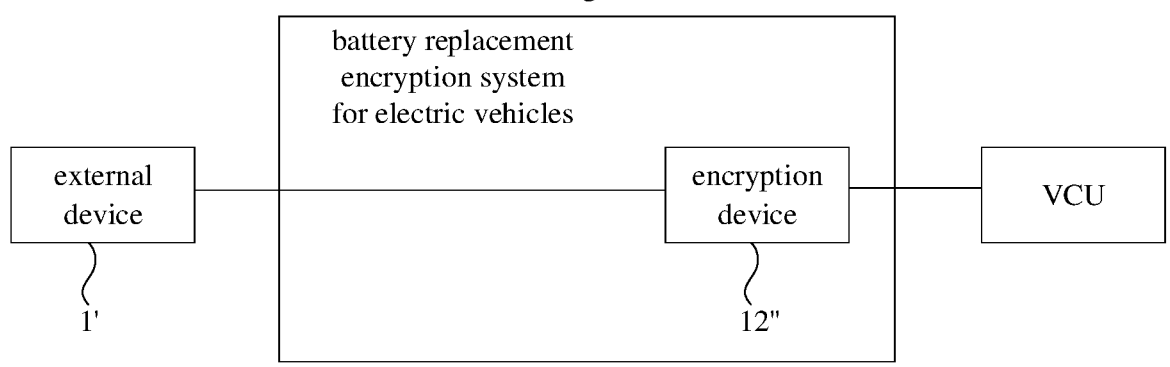
FIG. 6 is a schematic structural diagram of an electric vehicle battery replacement encryption system according to Embodiment 7 of the present invention.

This embodiment provides a battery replacement encryption system for electric vehicles. As shown in FIG. 6, the battery replacement encryption system for electric vehicles comprises an encryption device 12"; the encryption device 12" is used to receive the replacement completion signal and is used to set the replacement legal signal after receiving the replacement completion signal; the replacement completion signal is used to indicate that the electric vehicle has completed the battery replacement in a legal battery replacement mechanism; the encryption device is further used to send the replacement legal signal to the VCU; when the replacement legal signal is set, the VCU is used to allow the electric vehicle to run.

When an user drives the electric vehicle to the battery replacement station (that is, a legal battery replacement operation organization) for battery replacement, after the battery replacement, an external device 1' set in the battery replacement station sends the replacement completion signal, the replacement completion signal indicates that the battery replacement operation is a legal replacement operation performed at the battery replacement station, and the battery installed on the electric vehicle is a battery from a formal channel. After receiving the replacement completion signal, the encryption device sets the replacement legal signal (for example, the encryption device sets the replacement legal signal to "1"). The encryption device sends the replacement legal signal to the VCU, after receiving the replacement legal signal which is set, the VCU identifies that the battery replacement is a legal replacement operation, and the electric vehicle is allowed to run.

If the user does not replace the battery at the battery replacement station, but removes and replaces the battery privately, the encryption device cannot receive the replacement completion signal after the battery has been replaced, and the replacement legal signal will be reset with state "0". The encryption device sends a replacement legal signal to the VCU, after receiving the replacement legal signal which is reset, the VCU identifies that the battery replacement is an illegal operation, and the electric vehicle is prohibited from running The battery replacement encryption system for electric vehicles of this embodiment can monitor whether the battery replacement operation complies with the operation standards for battery replacement, and for private battery replacement behaviors, punitive measures prohibiting the electric vehicle from running are given, thereby effectively curbing the behavior of private battery replacement.

Embodiment 8

Figure 7:
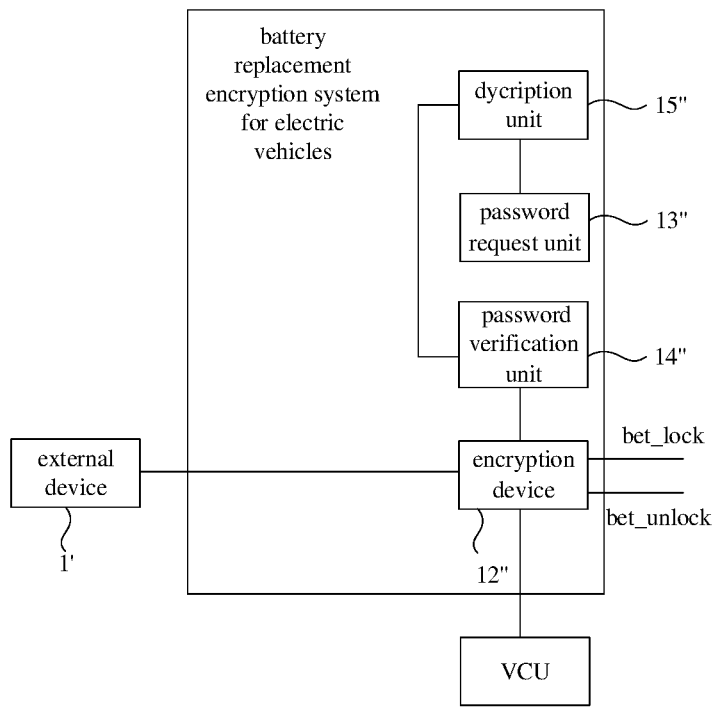
FIG. 7 is a schematic structural diagram of an electric vehicle battery replacement encryption system according to Embodiment 8 of the present invention.

On the basis of the battery replacement encryption system for electric vehicles of Embodiment 7, as shown in FIG. 7, in the battery replacement encryption system for electric vehicles of this embodiment, the encryption device is further used to obtain a battery unlock signal, and the battery unlock signal is used to indicate that a battery pack is removed from the electric vehicle. The electric vehicle is equipped with a mechanism to detect the installation state of the battery. In the process of the battery replacement, once the battery is removed, the mechanism will send the battery unlock signal bet_unlock, and the encryption device will reset the replacement legal signal after receiving the battery unlock signal bet_unlock. When the VCU receives the replacement legal signal that has been reset, it prohibits the electric vehicle from running to ensure the security of the electric vehicle.

When the battery is installed on the electric vehicle again, the mechanism that detects the installation state of the battery sends a battery lock signal bet_lock, and the encryption device receives the battery lock signal bet_lock. If the battery replacement is completed at a legal and formal battery replacement station, the encryption device will further receive the replacement completion signal within a preset time (the preset time can be set as needed), and the encryption device will set the replacement legal signal after receiving the battery lock signal and the replacement completion signal. The VCU will allow the electric vehicle to run. If the encryption device does not receive the replacement completion signal within the preset time after receiving the battery lock signal bet_lock, it indicates that the electric vehicle has performed a battery replacement operation, the battery has been removed, and another battery has been installed on the electric vehicle, however, the replacement operation was not completed at a formal battery replacement station. Therefore, the encryption device does not receive the replacement completion signal, and the encryption device resets the replacement legal signal. The VCU will prohibit the electric vehicle from running.

For electric vehicles that cannot run due to the battery replacement in private, this embodiment further provides humane remedial measures. As shown in FIG. 7, the battery replacement encryption system of this embodiment further comprises a password request unit 13", a password verification unit 14", and a decryption unit 15"; the password verification unit 14" is in communication connection with the encryption device 12"; the password request unit 13" is used to send a password request signal to the decryption unit 15" when the replacement legal signal is reset; the decryption unit is used to send the password; the password verification unit 14" is used to receive the password; the password verification unit 14" is further used to verify the password and is used to send a verification success identifier to the encryption device if the password verification is successful, the encryption device is further used to set the replacement legal signal after receiving the verification success identifier.

The decryption unit 15" is set in the customer service center of the battery replacement station (in other optional embodiments of the present invention, the decryption unit is set in the operation center of the operator of the electric vehicle). When the electric vehicle cannot run due to private battery replacement, the user can use the password request unit to send a password request signal to the decryption unit, for example, dial the customer service number of the battery replacement station, explain the private battery replacement situation to the customer service center, and request the customer service center for providing the unlock password. The customer service center records the information of the electric vehicle (license plate number, battery number, etc.), and records the behavior of private battery replacement (if necessary, the battery replacement station sends staff to the site to confirm). The customer service center is equipped with the decryption unit 15" capable of generating an unlock password, and the customer service center provides the user with the unlock password in the form of SMS, etc. After receiving the unlock password, the password verification unit performs verification according to a preset algorithm, and sends a verification success identifier to the encryption device if the password verification is successful; the encryption device sets the replacement legal signal after receiving the verification success identifier. After receiving the legal signal that has been set, the VCU allows the electric vehicle to run.

Embodiment 9

Figure 8:
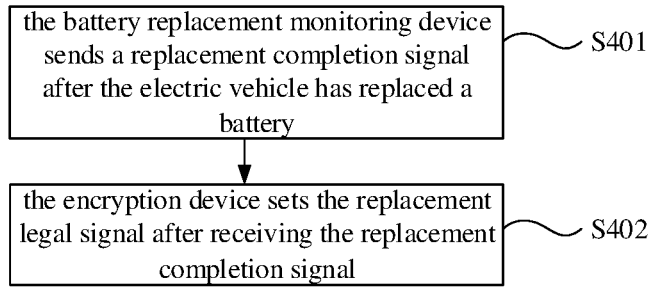
FIG. 8 is a flowchart of a battery replacement encryption method according to Embodiment 9 of the present invention.

This embodiment provides a battery replacement encryption method, in this embodiment, the battery replacement encryption method is implemented by using the battery replacement encryption system of Embodiment 1. As shown in FIG. 8, the battery replacement encryption method comprises the following steps:

Step S401, the battery replacement monitoring device sends a replacement complete signal after the electric vehicle has replaced a battery;

Step S402, the encryption device sets the replacement legal signal after receiving the replacement completion signal.

When an user drives the electric vehicle to the battery replacement station (that is, a legal battery replacement operation organization) for battery replacement, after the battery replacement, the battery replacement monitoring device sends the replacement completion signal, the replacement completion signal indicates that the battery replacement operation is a legal battery replacement operation performed at the battery replacement station, and the battery installed on the electric vehicle is a battery from a formal channel. After receiving the replacement completion signal, the encryption device sets the replacement legal signal (for example, the encryption device sets the replacement legal signal to "1"). If the user does not replace the battery at the battery replacement station, but replaces the battery in private, the encryption device cannot receive the replacement completion signal after the battery has been replaced, and the replacement legal signal will be reset.

The state of the replacement legal signal can indicate whether the electric vehicle has performed a legal replacement operation (that is, conforms to the operation standard for battery replacement). If the replacement legal signal is set and the state is "1", it indicates that the electric vehicle has performed a legal replacement operation, and the battery installed on the electric vehicle is a battery from the formal channel; if the replacement legal signal is reset and the state is "0", it indicates that the electric vehicle has performed an illegal replacement operation, and the battery installed on the electric vehicle is very likely to be replaced with a low-quality battery. The state of the replacement legal signal can be used to effectively identify whether the replacement operation of the electric vehicle is legal, so as to monitor the circulation of the battery. If it is found that the electric vehicle has replaced a battery in private that does not meet the operation standards for battery replacement, the battery replacement station can take corresponding measures, for example, claims for compensation.

Example 10

Figure 9:
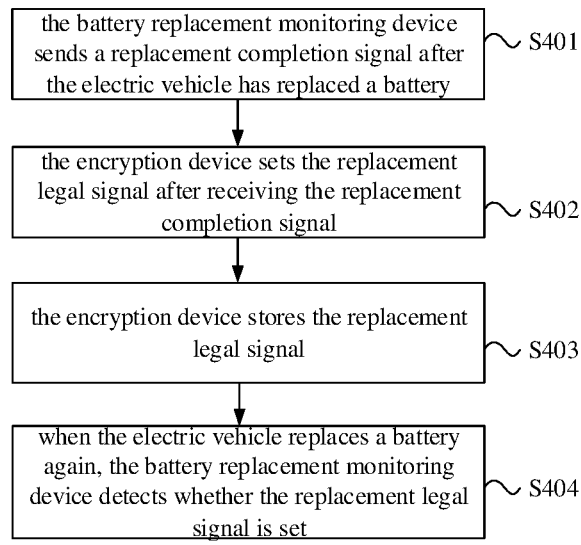
FIG. 9 is a flowchart of a battery replacement encryption method according to Embodiment 10 of the present invention.

This embodiment provides a battery replacement encryption method. In this embodiment, the battery replacement encryption method is implemented by using the battery replacement encryption system of Embodiment 2. As shown in FIG. 9, the battery replacement encryption method comprises the following steps:

Step S401, the battery replacement monitoring device sends a replacement completion signal after the electric vehicle has replaced a battery;

Step S402, the encryption device sets a replacement legal signal after receiving the replacement completion signal;

Step S403, the encryption device stores the replacement legal signal;

Step S404, when the electric vehicle replaces a battery again, the battery replacement monitoring device detects whether the replacement legal signal is set.

When the user drives the electric vehicle to the battery replacement station for battery replacement, and after the battery replacement, the battery replacement monitoring device sends a replacement completion signal, the replacement completion signal indicates that the battery replacement operation is a legal battery replacement operation performed at the battery replacement station, and the battery installed on the electric vehicle is a battery from a formal channel After receiving the replacement completion signal, the encryption device sets the replacement legal signal (for example, the encryption device sets the replacement legal signal to "1"). The encryption device stores the legal signal that has been set. When the electric vehicle enters the battery replacement station again for battery replacement, the battery replacement monitoring device reads the replacement legal signal from the encryption device and detects whether it is set. When the battery replacement monitoring device reads the replacement legal signal with state "1", it indicates that the electric vehicle has performed a legal battery replacement operation, and the battery installed on the electric vehicle is a battery from a formal channel.

If the user does not replace the battery at the battery replacement station, but removes and replaces the battery privately, the encryption device cannot receive the replacement completion signal after the battery is replaced, and the replacement legal signal will be reset. When the electric vehicle enters the battery replacement station again, the replacement monitoring device reads the replacement legal signal with state "0" from the encryption device, which indicating that the electric vehicle has performed an illegal replacement operation, and the battery installed on the electric vehicle is very likely to be replaced privately with a low-quality battery.

Embodiment 11

Figure 10:
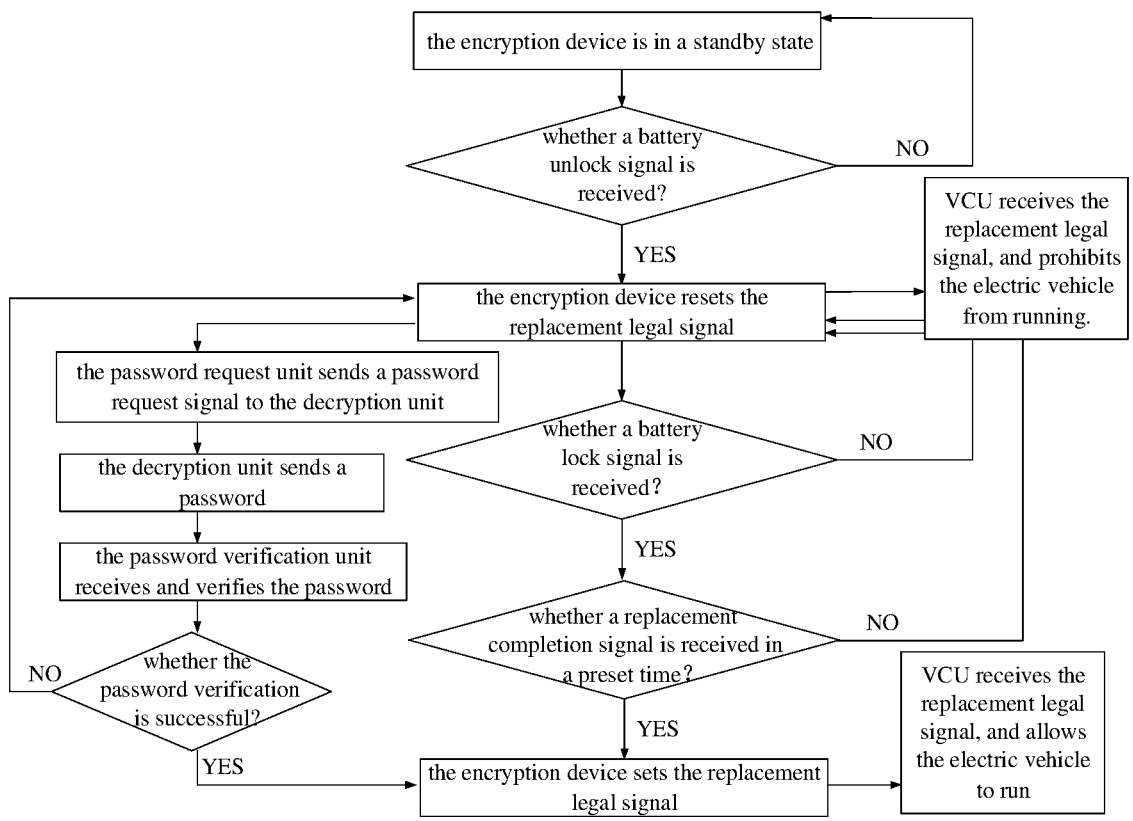
FIG. 10 is a flowchart of the battery replacement encryption method of Embodiment 11 and Embodiment 16 of the present invention.

This embodiment provides a battery replacement encryption method. In this embodiment, the battery replacement encryption method is implemented by using the battery replacement encryption system of Embodiment 3. As shown in FIG. 10, the specific process of the battery replacement encryption method is as follows:

In the initial state, no battery replacement operation has been performed, and the encryption device is in a standby state. At this time, the replacement legal signal is in the set state, indicating that no illegal battery replacement behavior in private has occurred.

The electric vehicle is equipped with a mechanism to detect the installation state of the battery. In the process of the battery replacement, once the battery is removed, the mechanism will send a battery unlock signal, and the encryption device will reset the replacement legal signal after receiving the battery unlock signal, after receiving the legal signal which is reset, the VCU prohibits the electric vehicle from running to ensure safety.

When the battery is installed on the electric vehicle again, the mechanism that detects the installation state of the battery sends a battery lock signal, and the encryption device receives the battery lock signal. If the battery replacement is completed at a legal and formal battery replacement station, the encryption device will further receive the replacement completion signal within a preset time (the preset time can be set as needed), and the encryption device will set the replacement legal signal after receiving the battery lock signal and the replacement completion signal. The VCU will allow the electric vehicle to run. If the encryption device does not receive the replacement completion signal within the preset time after receiving the battery lock signal, it indicates that the electric vehicle has performed a battery replacement operation, the battery has been removed, and another battery has been installed on the electric vehicle, however, the replacement operation was not completed at a formal battery replacement station. Therefore, the encryption device does not receive the replacement completion signal, and the encryption device resets the replacement legal signal. The VCU will prohibit the electric vehicle from running In other optional implementations of the battery replacement encryption method of the present invention, the encryption device does not send a replacement legal signal to the VCU, but stores the replacement legal signal. When the electric vehicle enters the battery replacement station again, the battery replacement monitoring device reads the replacement legal signal from the encryption device and detects whether it is set, to determine whether there is an illegal battery replacement behavior.

For electric vehicles that cannot run due to the battery replacement in private, this embodiment further provides humane remedial measures. When the electric vehicle cannot run due to private battery replacement, the user can use the password request unit to send a password request signal to the decryption unit, for example, dial the customer service number of the battery replacement station, explain the private battery replacement situation to the customer service center, and request the customer service center for providing the unlock password. The customer service center records the information of the electric vehicle (license plate number, battery number, etc.), and records the behavior of private battery replacement (if necessary, the battery replacement station sends staff to the site to confirm). The customer service center is equipped with a decryption unit capable of generating an unlock password, and the customer service center provides the user with the unlock password in the form of SMS, etc. After receiving the unlock password, the password verification unit performs verification according to a preset algorithm, and sends a verification success identifier to the encryption device if the password verification is successful; the encryption device sets the replacement legal signal after receiving the verification success identifier. After receiving the replacement legal signal which has been set, the VCU allows the electric vehicle to run. If the password verification fails, the legal signal will remain the state of reset.

Embodiment 12

Figure 11:
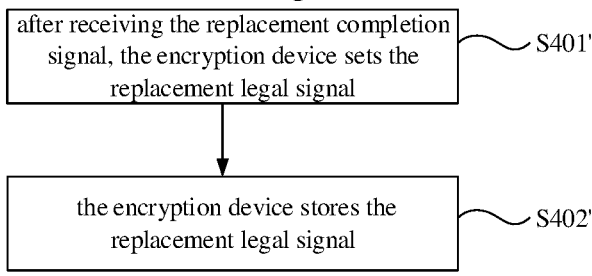
FIG. 11 is a flowchart of a battery replacement encryption method according to Embodiment 12 of the present invention.

This embodiment provides a battery replacement encryption method, which is implemented by using the battery replacement encryption system of Embodiment 4. As shown in FIG. 11, the battery replacement encryption method comprises the following steps:

Step S401', after receiving the replacement completion signal, the battery replacement encryption system sets the replacement legal signal, and the replacement completion signal is used to indicate that the electric vehicle has completed the battery replacement in a legal replacement mechanism;

Step S402', the encryption device stores the replacement legal signal.

When an user drives the electric vehicle to the battery replacement station (that is, a legal battery replacement operation organization) for battery replacement, after the battery replacement, an external device set in the battery replacement station sends the replacement completion signal, the replacement completion signal indicates that the battery replacement operation is a legal battery replacement operation performed at the battery replacement station, and the battery installed on the electric vehicle is a battery from a formal channel After receiving the replacement completion signal, the encryption device sets the replacement legal signal (for example, the encryption device sets the replacement legal signal to "1"). The encryption device stores the replacement legal signal, and the replacement legal signal which has been set indicates that the battery replacement is a legal operation.

If the user does not replace the battery at the battery replacement station, but removes and replaces the battery privately, the encryption device cannot receive replacement completion signal after the battery has been replaced, and the replacement legal signal will be reset by the encryption device with state "0". The encryption device stores the replacement legal signal, and the replacement legal signal which has been reset indicates that the battery replacement is an illegal operation.

The state of the replacement legal signal can indicate whether the electric vehicle has performed a legal replacement operation (that is, conforms to the operation standard for battery replacement). If the replacement legal signal is set and the state is "1", it indicates that the electric vehicle has performed a legal replacement operation, and the battery installed on the electric vehicle is a battery from the formal channel; if the replacement legal signal is reset and the state is "0", it indicates that the electric vehicle has performed an illegal replacement operation, and the battery installed on the electric vehicle is very likely to be replaced with a low-quality battery. The state of the replacement legal signal can be used to effectively identify whether the replacement operation of the electric vehicle is legal, so as to monitor the circulation of the battery. If it is found that the electric vehicle has replaced a battery in private that does not meet the operation standards for battery replacement, the battery replacement station can take corresponding measures, for example, claims for compensation.

Embodiment 13

Figure 12:
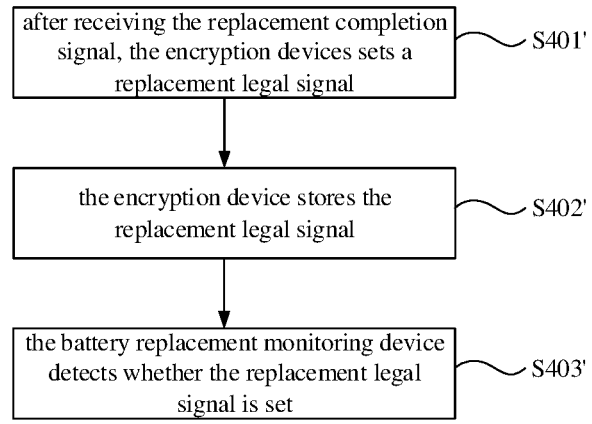
FIG. 12 is a flowchart of a battery replacement encryption method according to Embodiment 13 of the present invention.

This embodiment provides a battery replacement encryption method, which is implemented by using the battery replacement encryption system of Embodiment 5. As shown in FIG. 12, the battery replacement encryption method comprises the following steps:

Step S401', after receiving the replacement completion signal, the battery replacement encryption system sets the replacement legal signal, and the replacement completion signal is used to indicate that the electric vehicle has completed the battery replacement at a legal replacement mechanism;

Step S402', the encryption device stores the replacement legal signal;

Step S403', the battery replacement monitoring device detects whether the replacement legal signal is set.

After each replacement, the encryption device stores the replacement legal signal. As mentioned above, the state of the replacement legal signal can indicate whether the electric vehicle has performed a legal replacement operation or an illegal replacement operation. When the electric vehicle arrives at the battery replacement station again for battery replacement, the battery replacement monitoring device reads the replacement legal signal stored in the encryption device, and detects whether the replacement legal signal is set. If the replacement legal signal is in the set state ("1"), it indicates that the previous replacement operation of the electric vehicle was legal, the battery installed on the electric vehicle is a battery from a formal channel, and the battery replacement station can replace the battery for the electric vehicle accordingly; if the replacement legal signal is in the reset state ("0"), it indicates that the previous replacement operation of the electric vehicle was illegal, the battery installed on the electric vehicle is very likely not a battery from a formal channel, and the battery replacement station can detect the battery accordingly, and if it is confirmed that the battery is a low-quality battery replaced in private, the battery replacement station can claim for compensation to the user.

Embodiment 14

Figure 13:
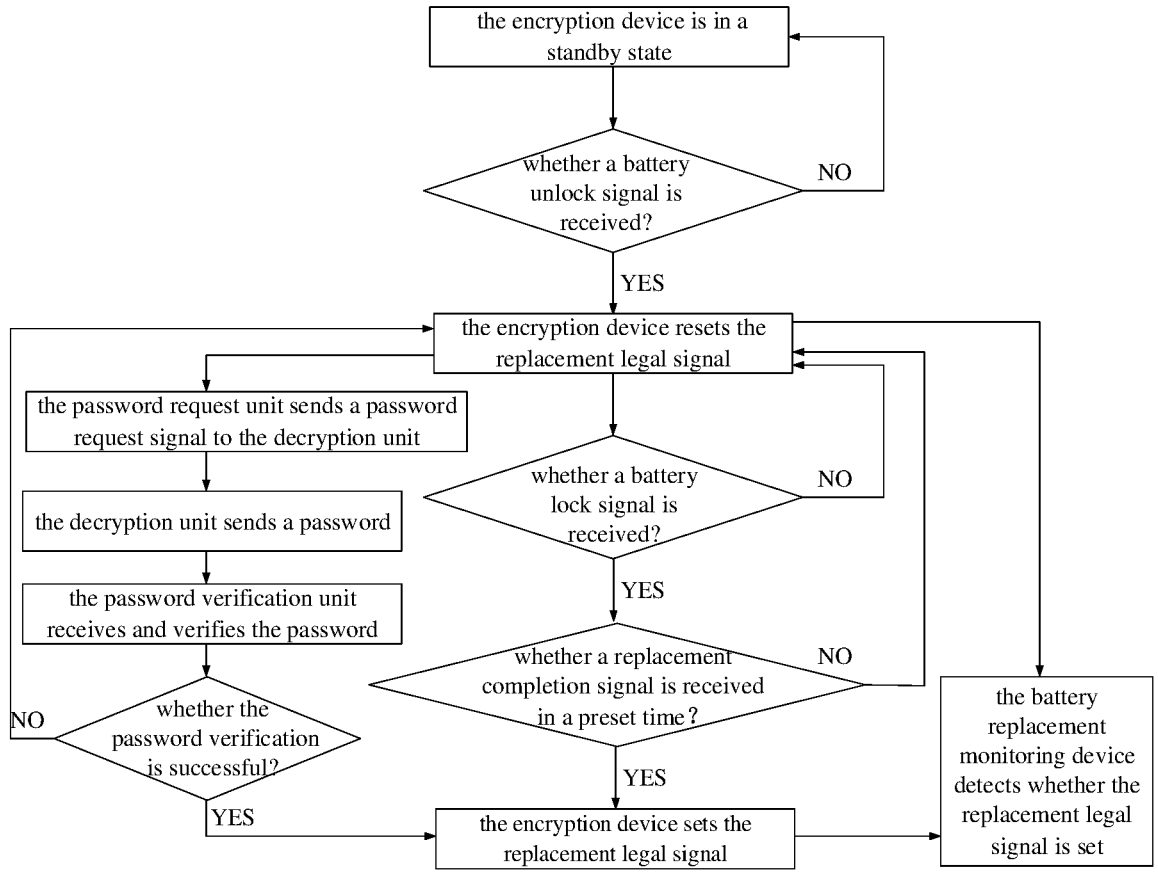
FIG. 13 is a flowchart of a battery replacement encryption method according to Embodiment 14 of the present invention.

This embodiment provides a battery replacement encryption method, which is implemented by using the battery replacement encryption system of Embodiment 6. As shown in FIG. 13, the specific process of the battery replacement encryption method is as follows:

In the initial state, no battery replacement operation has been performed, and the encryption device is in a standby state. At this time, the replacement legal signal is in the set state, indicating that no illegal battery replacement behavior in private has occurred.

The electric vehicle is equipped with a mechanism to detect the installation state of the battery. In the process of battery replacement, once the battery is removed, the mechanism will send a battery unlock signal, and the encryption device will reset the replacement legal signal after receiving the battery unlock signal.

When the battery is installed on the electric vehicle again, the mechanism that detects the installation state of the battery sends a battery lock signal, and the encryption device receives the battery lock signal. If the battery replacement is completed at a legal and formal battery replacement station, the encryption device will further receive the replacement completion signal within a preset time (the preset time can be set as needed), and the encryption device will set the replacement legal signal after receiving the battery lock signal and the replacement completion signal. If the encryption device does not receive the replacement completion signal within the preset time after receiving the battery lock signal, it indicates that the electric vehicle has performed a battery replacement operation, the battery has been removed, and another battery has been installed on the electric vehicle, however, the replacement operation was not completed at a formal battery replacement station. Therefore, the encryption device does not receive the replacement completion signal, and the encryption device resets the replacement legal signal.

For users who have performed an illegal battery replacement in private, the battery replacement encryption method of this embodiment provides remedial measures. When the user realizes that the battery replacement in private does not meet the operation standards for battery replacement or is a breach of contract, and the user is willing to reinstall the battery from the formal channel on the electric vehicle, the user can use the password request unit to send a password request signal to the decryption unit, and the decryption unit is set in the customer service center of the battery replacement station(in other optional embodiments of the present invention, the decryption unit is set in the operation center of the operator of the electric vehicle). For example, the user can dial the customer service number of the battery replacement station, explain to the customer service center the situation of the private battery replacement, and request the customer service center to provide the unlock password. The customer service center records the information of the electric vehicle (license plate number, battery number, etc.), and records the behavior of private battery replacement (if necessary, the replacement station sends staff to the site to confirm). The customer service center is equipped with a decryption unit, which can generate an unlock password, and the customer service center provides the user with the unlock password in the form of SMS, etc. After receiving the unlock password, the password verification unit performs verification according to the preset algorithm, and sends a verification success identifier to the encryption device if the password verification is successful; the encryption device sets the replacement legal signal after receiving the verification success identifier. If the password verification fails, the legal signal will remain the state of reset.

The battery replacement monitoring device reads the replacement legal signal stored in the encryption device, and detects whether the replacement legal signal is set. If the replacement legal signal is in the set state ("1"), it indicates that the previous replacement operation of the electric vehicle was legal, the battery installed on the electric vehicle is a battery from a formal channel; if the replacement legal signal is in the reset state ("0"), it indicates that the previous replacement operation of the electric vehicle was illegal.

Embodiment 15

Figure 14:
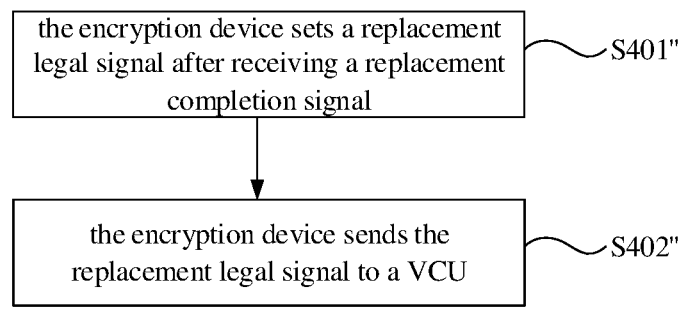
FIG. 14 is a flowchart of the encryption method for electric vehicle battery replacement according to Embodiment 15 of the present invention.

This embodiment provides a battery replacement encryption method for electric vehicles, which is implemented by using the battery replacement encryption system for electric vehicles of Embodiment 7. As shown in FIG. 14, the battery replacement encryption method for electric vehicles comprises the following steps:

Step S401", the encryption device sets a replacement legal signal after receiving a replacement completion signal, and the replacement completion signal is used to indicate that the electric vehicle has completed the battery replacement in a legal battery replacement mechanism;

Step S402", the encryption device sends the replacement legal signal to a VCU; and when the replacement legal signal is set, the VCU allows the electric vehicle to run.

When an user drives the electric vehicle to the battery replacement station (that is, a legal battery replacement operation organization) for battery replacement, after the battery replacement, an external device set in the battery replacement station sends the replacement completion signal, the replacement completion signal indicates that the battery replacement operation is a legal battery replacement operation performed at the battery replacement station, and the battery installed on the electric vehicle is a battery from a formal channel After receiving the replacement completion signal, the encryption device sets the replacement legal signal (for example, the encryption device sets the replacement legal signal to "1"). The encryption device sends the replacement legal signal to the VCU, after receiving the replacement legal signal, the VCU identifies the battery replacement is a legal battery replacement operation and allows the electric vehicle to run.

If the user does not replace the battery at the battery replacement station, but removes and replaces the battery privately, the encryption device cannot receive the replacement completion signal after the battery is replaced, and the replacement legal signal will be reset with state "0". The encryption device sends a replacement legal signal to the VCU, after receiving the replacement legal signal which is reset, the VCU identifies that the battery replacement is an illegal operation, and prohibits the electric vehicle from running The battery replacement encryption method for electric vehicles of this embodiment can monitor whether the battery replacement operation complies with the operation standards for battery replacement, and for private battery replacement behaviors, punitive measures prohibiting the electric vehicle from running are given, thereby effectively curbing the behavior of private battery replacement.

Embodiment 16

This embodiment provides a battery replacement encryption method for electric vehicles. The specific implementation process of the battery replacement encryption method for electric vehicles in this embodiment is the same as that of Embodiment 11, please refer to FIG. 10, the difference is that the replacement encryption method for electric vehicles is implemented by using the battery replacement encryption system for electric vehicles of embodiment 8. The battery replacement encryption method and system of the present invention can detect whether the user's battery replacement behavior conforms to the operation standards, and it will be easy for the battery replacement station to confirm whether the battery on the electric vehicle is replaced by a formal channel, so as to ensure that batteries of the battery replacement station are circulated in its own system to avoid loss; and the battery replacement station can also find the illegal battery replacement in private in time, and claims for compensation.

Although the specific embodiments of the present invention are described above, those skilled in the art should understand that the is only an example, various amendments or modifications can be made to these embodiments without departing from the principle and essence of the present invention. Therefore, the protection scope of the present invention is defined by the appended claims.

What is claimed is:

1. A battery replacement encryption system, wherein comprises an encryption device; the encryption device is used to receive a replacement completion signal, and is used to set a replacement legal signal after receiving the replacement completion signal;
   the replacement completion signal is used to indicate that an electric vehicle has completed a battery replacement in a legal battery replacement mechanism;
   and the encryption device is further used to store the replacement legal signal.

2. The battery replacement encryption system according to claim 1, wherein the battery replacement encryption system further comprises a battery replacement monitoring device, and the encryption device is in communication connection with the battery replacement monitoring device; when the electric vehicle replaces a battery again, the battery replacement monitoring device is used to detect whether the replacement legal signal is set.

3. The battery replacement encryption system according to claim 1, wherein the encryption device is further used to obtain a battery lock signal, and the battery lock signal is used to indicate that a battery pack is installed on the electric vehicle;
   and the encryption device is further used to set the replacement legal signal after receiving the battery lock signal and the replacement completion signal.

4. The battery replacement encryption system according to claim 1, wherein the encryption device is further used to obtain a battery unlock signal, and the battery unlock signal is used to indicate that a battery pack is removed from the electric vehicle;
   and the encryption device is further used to reset the replacement legal signal after receiving the battery unlock signal.

5. The battery replacement encryption system according to claim 1, wherein the encryption device is further used to obtain a battery lock signal, and the battery lock signal is used to indicate that a battery pack is installed on the electric vehicle;
   if the encryption device does not receive the replacement completion signal within a preset time after receiving the battery lock signal, the encryption device resets the replacement legal signal.

6. The battery replacement encryption system according to claim 3, wherein the battery replacement encryption system further comprises a password request unit, a password verification unit, and a decryption unit; the password verification unit is in communication connection with the encryption device;
   the password request unit is used to send a password request signal to the decryption unit when the replacement legal signal is reset;
   the decryption unit is used to send a password;
   the password verification unit is used to receive the password;
   the password verification unit is further used to verify the password, and is used to send a verification success identifier to the encryption device if the password verification is successful;
   the encryption device is further used to set the replacement legal signal after receiving the verification success identifier.

7. A battery replacement encryption system, wherein comprises a battery replacement monitoring device and an encryption device;
   the battery replacement monitoring device is used to send a replacement completion signal to the encryption device after an electric vehicle has replaced a battery;
   the encryption device is used to set a replacement legal signal after receiving the replacement completion signal.

8. The battery replacement encryption system according to claim 7, wherein the encryption device is further used to store the replacement legal signal.

9. The battery replacement encryption system according to claim 8, wherein, when the electric vehicle replaces a battery again, the battery replacement monitoring device is further used to detect whether the replacement legal signal is set.

10. The battery replacement encryption system according to claim 7, wherein the encryption device is further used to send the replacement legal signal to a VCU;
    if the replacement legal signal is set, the VCU allows the electric vehicle to run;
    otherwise, the VCU prohibits the electric vehicle from running.

11. The battery replacement encryption system according to claim 7, wherein the encryption device is further used to obtain a battery lock signal, and the battery lock signal is used to indicate that a battery pack is installed on the electric vehicle;
    the encryption device is further used to set the replacement legal signal after receiving the battery lock signal and the replacement completion signal.

12. The battery replacement encryption system according to claim 7, wherein the encryption device is further used to obtain a battery unlock signal, and the battery unlock signal is used to indicate that a battery pack is removed from the electric vehicle;
    the encryption device is further used to reset the replacement legal signal after receiving the battery unlock signal.

13. The battery replacement encryption system according to claim 7, wherein the encryption device is further used to obtain a battery lock signal, and the battery lock signal is used to indicate that a battery pack is installed on the electric vehicle;
    if the encryption device does not receive the replacement completion signal within a preset time after receiving the battery lock signal, the encryption device resets the replacement legal signal.

14. The battery replacement encryption system according to claim 13, wherein the battery replacement encryption system further comprises a password request unit, a password verification unit, and a decryption unit; the password verification unit is in communication connection with the encryption device;
    the password request unit is used to send a password request signal to the decryption unit when the replacement legal signal is reset;
    the decryption unit is used to send a password;
    the password verification unit is used to receive the password;
    the password verification unit is further used to verify the password, and is used to send a verification success identifier to the encryption device if the password verification is successful;
    the encryption device is further used to set the replacement legal signal after receiving the verification success identifier.

15. A battery replacement encryption system for electric vehicles, wherein comprises an encryption device; the encryption device is used to receive a replacement completion signal, and is used to set a replacement legal signal after receiving the replacement completion signal;
    the replacement completion signal is used to indicate that an electric vehicle has completed the battery replacement in a legal battery replacement mechanism;
    the encryption device is further used to send the replacement legal signal to a VCU;
    when the replacement legal signal is set, the VCU is used to allow the electric vehicle to run.

16. The battery replacement encryption system for electric vehicles according to claim 15, wherein the encryption device is further used to obtain a battery lock signal, and the battery lock signal is used to indicate that a battery pack is installed on the electric vehicle;
    the encryption device is further used to set the replacement legal signal after receiving the battery lock signal and the replacement completion signal.

17. The battery replacement encryption system for electric vehicles according to claim 16, wherein the encryption device is further used to obtain a battery unlock signal, and the battery unlock signal is used to indicate that a battery pack is removed from the electric vehicle;
    the encryption device is further used to reset the replacement legal signal after receiving the battery unlock signal;
    when the replacement legal signal is reset, the VCU is used to prohibit the electric vehicle from running.

18. The battery replacement encryption system for electric vehicle according to claim 15, wherein the encryption device is further used to obtain a battery lock signal, and the battery lock signal is used to indicate that a battery pack is installed on the electric vehicle;
    if the encryption device does not receive the replacement completion signal within a preset time after receiving the battery lock signal, the encryption device resets the replacement legal signal;
    when the replacement legal signal is reset, the VCU is used to prohibit the electric vehicle from running.

19. The battery replacement encryption system for electric vehicles according to claim 15, wherein the battery replacement encryption system further comprises a password request unit, a password verification unit, and a decryption unit; the password verification unit is in communication connection with the encryption device;

- the password request unit is used to send a password request signal to the decryption unit when the replacement legal signal is reset;
- the decryption unit is used to send a password;
- the password verification unit is used to receive the password;
- the password verification unit is further used to verify the password, and is used to send a verification success identifier to the encryption device if the password verification is successful;
- the encryption device is further used to set the replacement legal signal after receiving the verification success identifier.

* * * * *